United States Patent [19]
Imai et al.

[11] Patent Number: 5,325,494
[45] Date of Patent: Jun. 28, 1994

[54] COMPUTER

[75] Inventors: Toru Imai, Yokohama; Ichiro Tomoda, Tokyo; Mitsuo Saito, Yokosuka, all of Japan

[73] Assignee: Kabushiki Kaisha Toshiba, Kawasaki, Japan

[21] Appl. No.: 899,910

[22] Filed: Jun. 17, 1992

[30] Foreign Application Priority Data

Jun. 21, 1991 [JP] Japan .................................. 3-150189

[51] Int. Cl.⁵ .......................... G06F 9/30; G06F 9/40
[52] U.S. Cl. .................. 395/375; 364/263.2; 364/941
[58] Field of Search .......... 395/375, 775, 800

[56] References Cited

U.S. PATENT DOCUMENTS

| | | | |
|---|---|---|---|
| 4,733,346 | 3/1988 | Tanaka | 395/325 |
| 4,907,150 | 3/1990 | Arroyo | 395/575 |
| 4,945,510 | 7/1990 | Maeda et al. | 364/DIG. II |
| 5,021,993 | 6/1991 | Matoba et al. | 364/DIG. II |
| 5,093,917 | 3/1992 | Campbell | 395/700 |
| 5,119,483 | 6/1992 | Madden | 395/375 |
| 5,155,843 | 10/1992 | Stamm et al. | 395/575 |

*Primary Examiner*—David Y. Eng
*Attorney, Agent, or Firm*—Oblon, Spivak, McClelland, Maier & Neustadt

[57] ABSTRACT

According to this invention, a computer includes a register use information detecting unit for extracting pieces of information of registers, use of which is started and ended by executing instructions of a program, a register use information storing unit for storing information of a register whose value need be stored to execute an instruction in the program, a register use information referring unit for referring to register use information of the register use information storing unit, an instruction executing unit for executing predetermined processing for a desired register in accordance with a reference result of the register use information referring unit, and a register use information updating means for updating use information of a register stored in the register use information storing unit in accordance with outputs from the register use information detecting unit and the instruction executing unit.

11 Claims, 15 Drawing Sheets

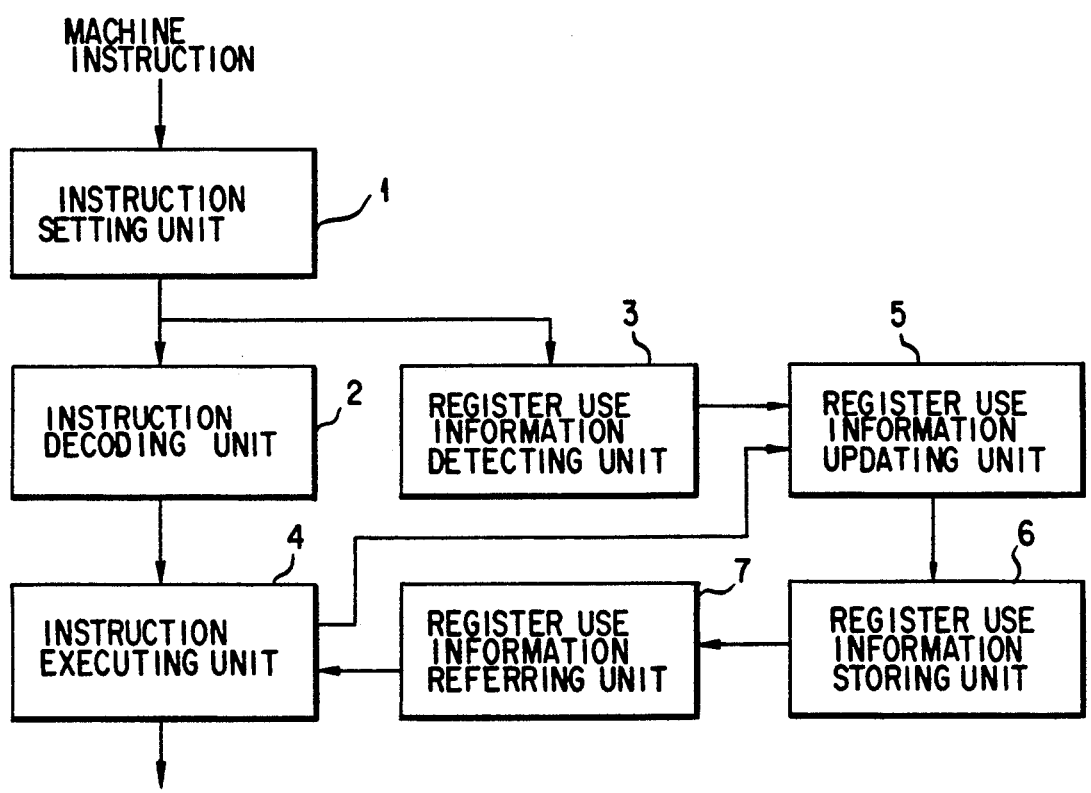
F I G. 1

```
    f (p, q)
    register p, q;
{
    register i, j;
    i = p + q;
    j = p * q;
    g (i + j, i - j);
    return (j);
}
    extern char a [ ];
    g (r, s)
    register r, s;
{
    register k;
    k = r - 1;
    a [S] = k;
}
```

FIG. 2

```
f:
    add    v1 ← p1、p2         (1)
    mul    v2 ← p1、p2         (2)
    add    p1 ← v1、v2         (3)
    sub    p2 ← v1、v2         (4)
    push   v2                  (5)
    call   g                   (6)
    pop    v2                  (7)
    move   r ← v2              (8)
    rtn                        (9)

g:
    sub    v1 ← p1、1          (10)
    store  v1 → p2、a          (11)
    rtn                        (12)
```

FIG. 3

(PRIOR ART)

```
f:
    push    v1              (1)
    push    v2              (2)
    add     v1←p1,p2        (3)
    mul     v2←p1,p2        (4)
    add     p1←v1,v2        (5)
    sub     p2←v1,v2        (6)
    call    g               (7)
    move    r←v2            (8)
    pop     v2              (9)
    pop     v1              (10)
    rtn                     (11)

g:
    push    v1              (12)
    sub     v1←p1,1         (13)
    store   v1→p2,a         (14)
    pop     v1              (15)
    rtn                     (16)
```

FIG. 4

(PRIOR ART)

```
f :
    save    <v1,v2>         (1)
    add     v1←p1,p2        (2)
    mul     v2←p1,p2        (3)
    add     p1←v1,v2        (4)
    sub     p2←v1*,v2       (5)
    call    g               (6)
    move    r←v2*           (7)
    restore                 (8)
    rtn                     (9)

g :
    save    <v1>            (10)
    sub     v1←p1,1         (11)
    store   v1*→p2,a        (12)
    restore                 (13)
    rtn                     (14)
```

F I G. 5

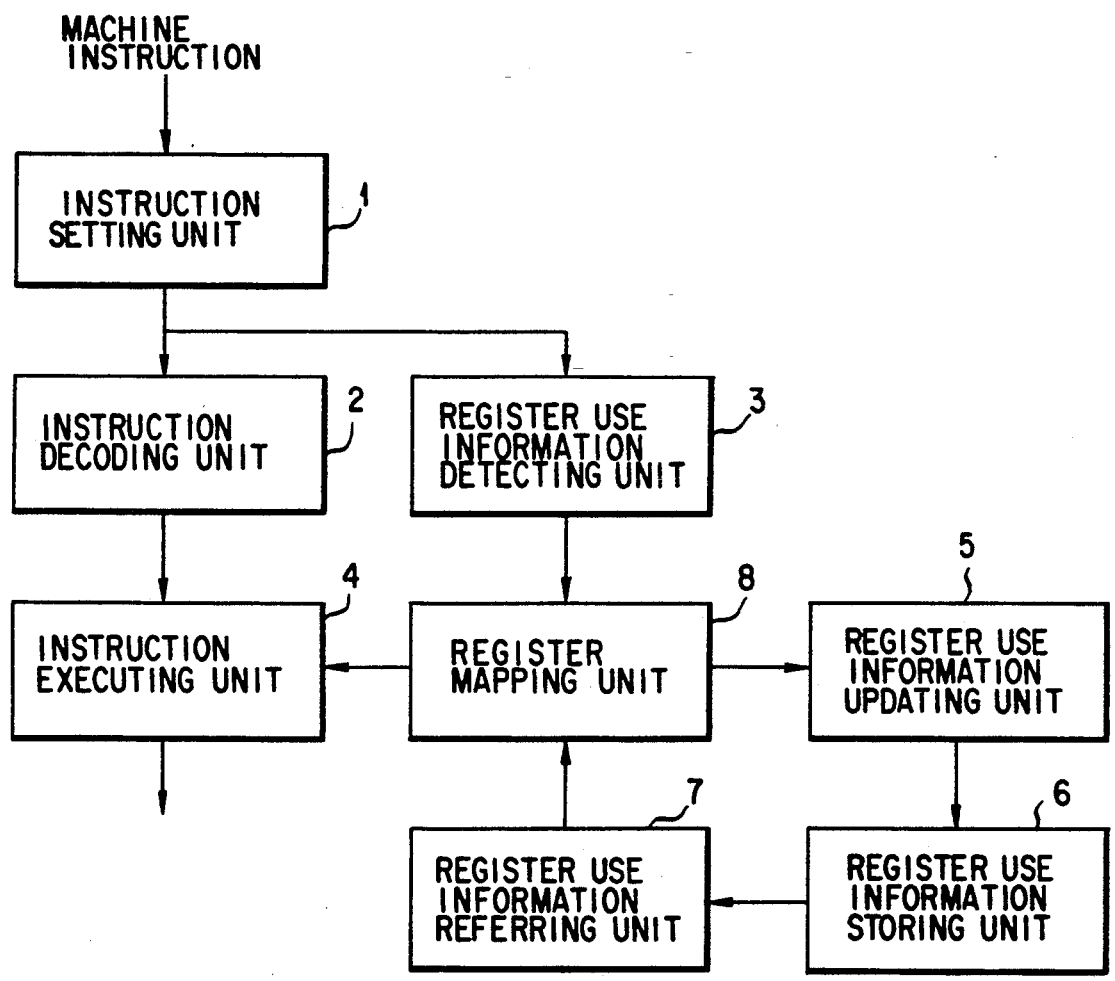
F I G. 11

```
f :
    add    v1 ← p1 , p2       (1)
    mul    v2 ← p1 , p2       (2)
    add    p1 ← v1 , v2       (3)
    sub    p2 ← v1 *, v2      (4)
    call   g                  (5)
    move   r ← v2 *           (6)
    restore                   (7)
    rtn                       (8)

g :
    sub    v1 ← p1 , 1        (9)
    store  v1* → p2 , a       (10)
    restore                   (11)
    rtn                       (12)
```

FIG. 13

```
    f (p, q)
    register p, q;
{
    register i, j;
    i = p + q;
    j = p * q;
    if ( i < 0 ) return (0)
    g ( i + j, i - j ) ;
    return ( j ) ;
}
    extern    char  a [ ];
    g ( r, s )
    register r, s ;
{
    register k ;
    k = r - 1 ;
    a [S] = k ;
}
```

F I G. 14

```
f :
    add    v1 ← p1, p2      (1)
    mul    v2 ← p1, p2      (2)
    cmp    p1, 0            (3)
    bc     lst, L1          (4)
    add    p1 ← v1, v2      (5)
    sub    p2 ← v1 *, v2    (6)
    call   g                (7)
    move   r ← v2*          (8)
    restore                 (9)
    rtn                     (10)
L1: move  r ← 0             (11)
    clear  <v1, v2>         (12)
    rtn                     (13)

g :
    sub    v1 ← p1, 1       (14)
    store  v1* → p2, a      (15)
    restore                 (16)
    rtn                     (17)
```

FIG. 15

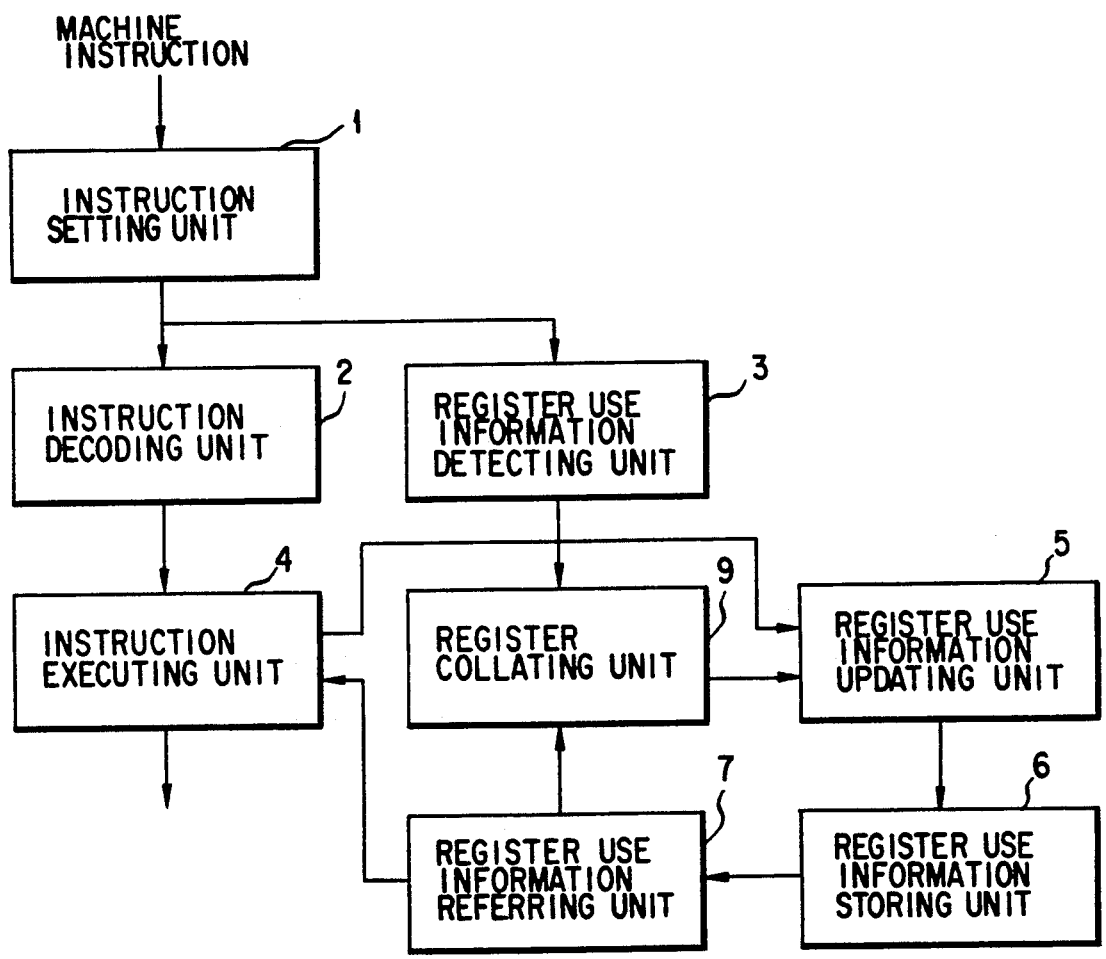
F I G. 16

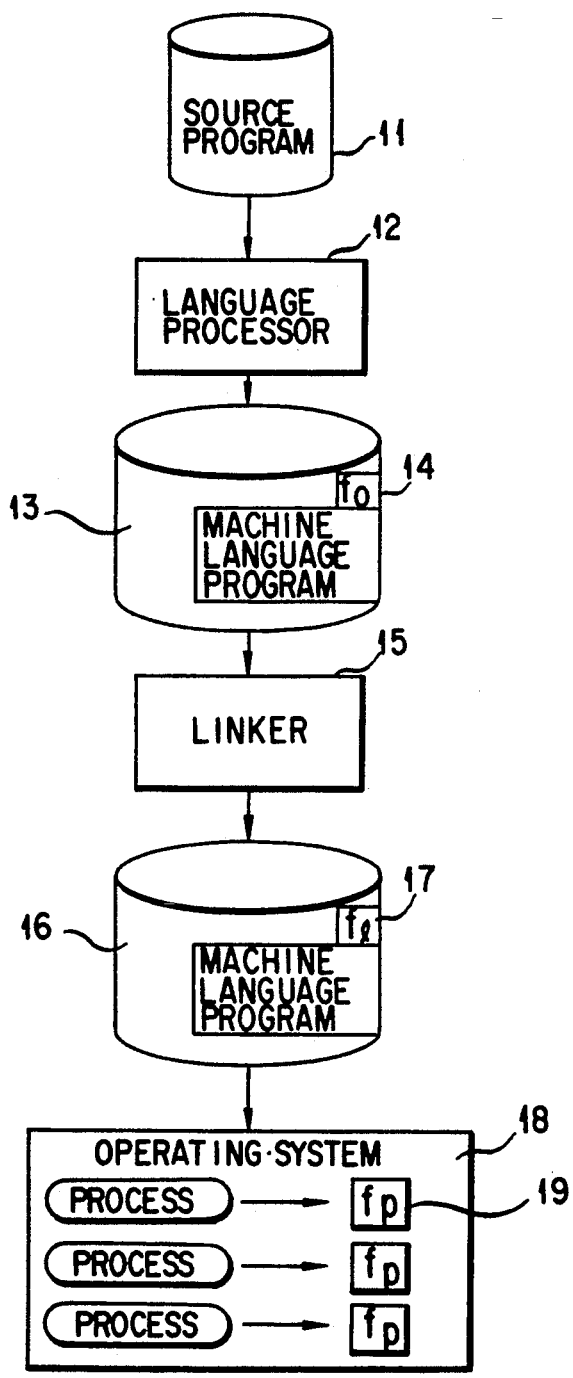
F I G. 17
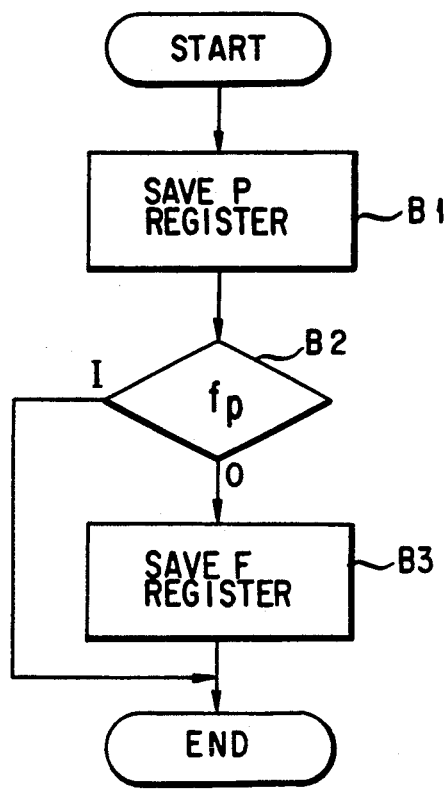
F I G. 18

COMPUTER

BACKGROUND OF THE INVENTION

1. Field of the Invention

The present invention relates to a computer capable of effectively using a register by recognizing a use state of the register in interruption processing or the like caused by executing a program.

2. Description of the Related Art

In a computer, the following processing is generally performed during execution of a program. For example, when the program is discontinued by procedure calling or interruption processing, a register is saved. In contrast to this, when control is returned from a procedure, or the program which has been interrupted by the interruption processing is continuously executed, the register is returned.

However, the conventional machine has no means for recognizing a register supposed to store values for normally operating a program during execution of the procedure calling or interruption processing.

As a result, in the conventional machine, when the procedure calling or interruption processing is to be performed, it is not recognized which register is required after the program is continued. Therefore, in a conventional machine, all registers including registers which need not be saved are saved, and, as in a returning operation, all the registers including registers which need not be returned are returned. This operation is an important factor for prolonging an execution time of the program.

In the procedure calling, for example, a case wherein a new procedure B is called from a procedure A will be described below. In this case, a register may be used after control is returned from the procedure B to the procedure A, and the value of the register changed by the procedure B must often be saved.

There are two methods for saving a register. The first method is a method of saving a register on a caller side, i.e., on the procedure A (to be referred to as caller saved convention). The second method is a method of saving a register on a callee side, i.e., the procedure B (to be referred to as callee saved convention).

According to the first method, in order to perform a saving operation in the procedure A, it is not recognized which register can be changed in the procedure B. Therefore, all registers which may be used after control is returned from the procedure B must be saved regardless of whether the registers are changed in the procedure B. In contrast to this, according to the second method, it is not recognized which register is used in the procedure A after control is returned from the procedure B. Therefore, all registers which are to be changed in the procedure B must be saved regardless of whether these registers are used in the procedure A after control is returned from the procedure B. For this reason, in both the first and second methods, an operation for saving registers which need not be saved is performed.

In the interruption processing, a case wherein a currently executed program is interrupted by interruption processing such as a trap or interruption will be described below. In this case, a register used during the interruption processing must be saved to continue the program. However, since it is not recognized which register is required after the program is continued, an operation for saving all registers, i.e., an operation for saving registers which need not be saved, is performed.

In returning registers, as in the saving of registers, an operation for returning registers which need not be returned is performed in each of the procedure calling and the interruption processing.

As described above, when the conventional procedure calling and interruption processing are to be performed, it is not recognized which register is a register whose value is required to normally operate an execution program. As described above, in all the procedure or interruption processing, all registers are saved/returned. Therefore, since saving/returning operations of the registers are redundant, an execution speed of the program is decreased.

A program generally consists of several procedures. In order to minimize saving/returning operations of registers, different registers are preferably used on a callee side and a caller side with respect to calling of the procedures. In this case, a procedure calling relation is checked in a compiling or linking operation, and registers are assigned such that the registers used on the caller and callee sides do not overlap each other. However, the register assignment can be performed only when very severe conditions are satisfied, e.g., when a target procedure is called from only one portion or when the calling does not depend on the input series of a program. For this reason, in many cases, since assignment must be performed without recognizing the use state of the registers when a procedure is called, assignment means is not used effectively.

As described above, in a conventional computer, register assignment cannot be performed sufficiently using hardware resources. Although there is an empty register, a register in use may be assigned without assigning the empty register. Therefore, in the conventional machine, registers which need not be saved/returned must be saved/returned.

The following method is known. Registers which are returned in procedure calling and registers which are not returned are permanently classified, and the number of registers subjected to saving/returning operations in the procedure calling is decreased, thereby decreasing the load of the saving/returning operations. However, according to this method, when registers of one type are short, since registers of the other type cannot be used as the registers of one type, the registers cannot be effectively used.

In addition, in a computer program, after the value of a register is defined, the value is to be referred to. However, when the program has an error, the value may be referred to without defining the value. The program must be detected before the program is executed or during execution of the program. However, in a conventional technique, even when a program is analyzed by software before the program is executed, a relation between the definition and reference of the value is not always detected. In addition, since there is no analyzing means during execution of the program, reference of an undefined register cannot be easily checked.

With the above arrangement, in a conventional computer, it is not realized which register is generally required after a program is continued. Therefore, all registers including registers which need not be saved are saved. On the other hand, as in returning registers, all registers which need not be returned are returned. This is an important factor of prolonging an execution time of the program.

Related arts of the present invention are U.S. Pat. No. 5,021,993 and U.S. Pat. No. 4,945, 510.

SUMMARY OF THE INVENTION

It is an object of the present invention to provide a computer in which unnecessary saving/returning operations of registers are not performed, the registers can be efficiently used to realize a high-speed program, abnormal reference of registers each having an undefined value can be detected, and the number of apparent registers is increased without increasing the number of registers and the number of fields of registers.

According to the first aspect of the present invention, a computer for storing/returning a register by predetermined processing in a process of executing a program has register use information storing means for storing register information, a value of which must be stored to execute an execution program, refers to the register information of the register use information storing means, and determines a register to be saved/returned by a reference result.

According to the first aspect of the present invention, only minimum registers to be saved can be determined in interruption processing or in calling a procedure by referring to the content of register use information storing means, only the minimum registers are subjected to a saving operation, and only the saved registers can be subjected to a returning operation.

According to the second aspect of the present invention, a computer for storing/returning a register by predetermined processing in a process of executing a program has register use information storing means for storing register information, a value of which must be stored to execute an execution program, virtually assigning a register in accordance with an instruction in the program, and refers to the register use information storing means during execution of the program to assign the registers.

According to the second aspect of the present invention, assignment of registers instructed in the program is processed as virtual assignment, assignment of an unused register is attempted. The register need not be saved when this assignment is succeeded. The register is saved and can be used only when the assignment has failed. Therefore, an empty register is advantageously used, and registers need not be classified in advance, thereby effectively using registers.

According to the third aspect of the present invention, in a computer, a predetermined unused register for each program is detected, information representing that the predetermined register is not used in each process operated on an operating system on the basis of a detection result is stored, the information of the process is checked prior to execution of the process, and saving-/returning operations for a register which is determined as an unused register is omitted.

According to the third aspect of the present invention, since the information representing that the predetermined register is not used stored in each process is checked before execution of each process operated on an operating system, saving/returning operations for a register which is determined as an unused register can be omitted, and unnecessary saving/returning operations of registers can be prevented.

According to the first to third aspects of the present invention, when a register must be saved/returned due to calling of a procedure or interruption processing, only minimum registers can be saved/returned. When a register which is not used during execution of the program is retrieved and assigned, registers can be effectively used. In addition, abnormal reference of registers can be detected. Therefore, a computer having a high-speed operation and high reliability can be provided. When a program in which a floating-point operation is not operated is executed in a computer having, e.g., a register for only a floating-point operation, unnecessary saving/returning operations of registers can be omitted in a computer having plural types of registers having different applications in interruption processing performed during execution of a program having unused registers, thereby further enhancing the effect of the processing.

According to the fourth aspect of the present invention, in a computer, every time predetermined processing is performed in a process for executing a program, a register pointer is incremented, the pointer used when the program is executed is stored in a register, and the content of the register is cleared and the register pointer is decremented at an end of the predetermined processing.

According to the fourth embodiment of the present invention, since the value of the register for storing a pointer is increased and decreased on the basis of the start/end of the predetermined processing, an apparent register amount is increased without an increase in register field, data stored before the start of the predetermined processing is not broken, and desired data can be accessed in later processing.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing an arrangement of the first embodiment of the present invention;

FIG. 2 is a view showing a program used in the embodiment shown in FIG. 1;

FIG. 3 is a view showing an instruction string according to conventional caller saved convention when the program shown in FIG. 2 is executed;

FIG. 4 is a view showing an instruction string according to conventional callee saved convention when the program shown in FIG. 2 is executed;

FIG. 5 is an instruction string when the program shown in FIG. 2 is executed;

FIG. 11 is a view showing an arrangement of the second embodiment of the present invention;

FIG. 13 is a view showing an instruction string when the embodiment shown in FIG. 11 is executed;

FIG. 14 is a view showing a program used in a modification of the second embodiment;

FIG. 15 is an instruction string when the program shown in FIG. 14 is executed;

FIG. 16 is a view showing an arrangement of the third embodiment of the present invention;

FIG. 17 is a view showing an arrangement of the fourth embodiment of the present invention;

FIG. 18 is a flow chart for explaining the embodiment shown in FIG. 17; and

FIGS. 19A to 19C are views for explaining the fifth embodiment of the present invention, in which FIG. 19A is a view showing a case wherein the same register is overlappingly referred to in an execution program, FIG. 19B is a view showing the shift of a pointer, and FIG. 19C is a view showing a case wherein the same register is referred to in a subroutine.

DETAILED DESCRIPTION OF THE PREFERRED EMBODIMENTS

Figure 6:
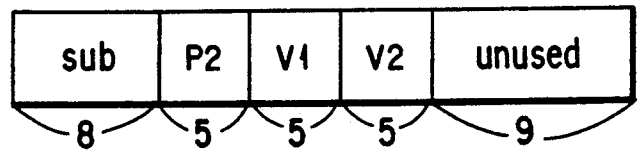
FIG. 6 is a view showing a format of a conventional instruction.

Embodiments of the present invention will be described below with reference to the accompanying drawings.

FIG. 1 is a block diagram showing a schematic arrangement of the first embodiment of the present invention.

A computer according to the present invention consists of an instruction setting unit 1, an instruction decoding unit 2, a register use information detecting unit 3, an instruction executing unit 4, a register use information updating unit 5, a register use information storing unit 6, and a register use information referring unit 7.

In the above arrangement, an operation of the computer according to the present invention will be described below.

A machine instruction input to the instruction setting unit 1 is supplied to the instruction decoding unit 2 and the register use information detecting unit 3.

The instruction decoding unit 2 decodes an instruction string of the machine instruction input to the instruction setting unit 1. The register use information detecting unit 3 executes the machine instruction input to the instruction setting unit 1 to extract pieces of information from a register, use of which is started (to be referred to as a use start register hereinafter) and a register, use of which is ended (to be referred to as a use end register hereinafter).

The instruction decoded by the instruction decoding unit 2 is supplied to the instruction executing unit 4. The instruction executing unit 4 executes the instruction decoded by the instruction decoding unit 2.

Outputs from the register use information detecting unit 3 and the instruction executing unit 4 are supplied to the register use information updating unit 5. The register use information updating unit 5 updates a value stored in the register use information storing unit 6 on the basis of the outputs from the register use information detecting unit 3 and the instruction executing unit 4. The register use information storing unit 6 stores register use information of a register having a value used by a currently executed program at this time.

An output from the register use information storing unit 6 is supplied to the register use information referring unit 7. The register use information referring unit 7 refers to the value of the register use information storing unit 6. Information from the register use information referring unit 7 is output to the instruction executing unit 4.

FIG. 2 is a program for explaining saving and returning operations of registers when a procedure is called. FIG. 2 shows a case wherein a procedure g is called from a procedure f.

According to the program shown in FIG. 2, an instruction string for performing a register saving operation according to caller saved convention will be described below using FIG. 3. In this case, registers p1, p2, . . . are used as arguments sent to a procedure, a register r is used as a value returned from the procedure, and registers v1, v2, . . . are used as variables used in the procedure. The instruction string shown in FIG. 3 has the following instructions:

An instruction (1) is an instruction in which addition between the values of the register p1 assigned with a variable p and the register p2 assigned with a variable q is performed to store the resultant value in the register v1 assigned with a variable i.

An instruction (2) is an instruction in which multiplication between the values of the registers p1 and p2 is performed to store the resultant value in the register v2 assigned with a variable j.

An instruction (3) is an instruction in which addition between the values of the registers v1 and v2 is performed to store the resultant value in the register p1 supposed to be assigned with the first argument.

An instruction (4) is an instruction in which subtraction between the values of the registers V1 and V2 is performed to store the resultant value in the register p2 supposed to be assigned with the second argument.

An instruction (5) is an instruction for saving the register v2 assigned with the variable j required after control is returned from the procedure g.

An instruction (6) is an instruction for calling the procedure g.

An instruction (7) is an instruction for returning a saved value to the register v2.

An instruction (8) is an instruction for storing a return value in the register r supposed to be stored with the return value.

An instruction (9) is an instruction for returning control from the procedure f to the procedure in which the procedure f is called.

An instruction (10) is an instruction in which 1 is subtracted from the register p1 assigned with a first argument r to store the resultant value in the register v1 assigned with a variable k.

An instruction (11) is an instruction for storing the value of the register v1 in the register p2 assigned with a second argument s at an address of an array element a[s]determined by adding the start address of an array a.

An instruction (12) is an instruction for returning control from the procedure g to the procedure in which the procedure g is called.

In the above instruction string, when the procedure g is called from the procedure f, or after control is returned from the procedure g, the register v2 assigned with the variable j whose value is required is saved in the procedure f before the procedure g is called. The register v2 is returned when the control is returned from the procedure g. However, in FIG. 3, since the register v2 is not used in the procedure g, the register v2 need not be saved and returned in the procedure f.

According to the program shown in FIG. 2, an instruction string for performing register saving according to callee saved convention will be described below using FIG. 4. In this case, registers p1, p2,... are used as arguments sent to a procedure, a register r is used as a value returned from the procedure, and registers v1, v2,... are used as variables used in the procedure. The instruction string shown in FIG. 4 shows the following instructions:

An instruction (1) is an instruction for saving the register v1 whose value is changed by the procedure f.

An instruction (2) is an instruction for saving the register v2 whose value is changed by the procedure f.

An instruction (3) is an instruction in which addition between the values of the register p1 assigned with a variable p and the register p2 assigned with a variable q is performed to store the resultant value in the register v1 assigned with a variable i.

An instruction (4) is an instruction in which multiplication between the values of the registers p1 and p2 is performed to store the resultant value in the register v2 assigned with a variable j.

An instruction (5) is an instruction in which addition between the values of the registers v1 and v2 is performed to store the resultant value in the register p1 supposed to be stored with the first argument.

An instruction (6) is an instruction in which subtraction between the values of the registers v1 and v2 is performed to store the resultant value in the register p2 supposed to be assigned with the second argument.

An instruction (7) is an instruction for calling the procedure g.

An instruction (8) is an instruction for storing a return value in the register r supposed to be stored with the return value.

An instruction (9) is an instruction for returning the register v2 saved by the instruction (2).

An instruction (10) is an instruction for returning the register v1 saved by the instruction (1).

An instruction (11) is an instruction for returning control from the procedure f to the procedure in which the procedure f is called.

An instruction (12) is an instruction for saving the register v1 whose value is changed by the procedure g.

An instruction (13) is an instruction in which 1 is subtracted from the register p1 assigned with a first argument r to store the resultant value in the register v1 assigned with a variable k.

An instruction (14) is an instruction for storing the value of the register v1 in the register p2 assigned with a second argument s at an address of an array element a[s] determined by adding the start address of an array a.

An instruction (15) is an instruction for returning the register v1 saved by the instruction (12).

An instruction (16) is an instruction for returning control from the procedure g to the procedure in which the procedure g is called.

In the above instruction string, at the starts of the procedures f and g, the registers which are used in the procedures f and g are saved to be used, respectively. At the ends of the procedures f and g, these registers are returned, and control is returned to the procedure in which the procedures f and g are called. Therefore, although the register v1 used in the procedure g is saved, this register is not used after control is returned to the procedure f, and the register need not be saved and returned in the procedure g.

As described above, in a conventional computer, when a procedure is called by the caller saved convention method or the callee saved convention method, in any of the method, the minimum number of registers to be saved is required, i.e., a value must be stored after control is returned from the procedure. In addition, since a register changed by a callee procedure cannot be generally known during compilation, unnecessary saving/ returning operations of registers must be performed.

FIG. 5 shows an instruction string for saving registers according to the program shown in FIG. 2 as the first embodiment of the present invention.

In this case, registers p1, p2,... are used as arguments sent to a procedure, a register r is used as a value returned from the procedure, and registers v1, v2,... are used as variables used in the procedure. The instruction string in FIG. 5 has the following instructions:

An instruction (1) is an instruction in which the values of the registers v1 and v2 are changed by a procedure f. The registers v1 and v2 are saved when use of the registers v1 and v2 during execution of this instruction is described in the register use information storing unit 6.

An instruction (2) is an instruction for performing addition between the value of the register p1 assigned with a variable p and the value of the register p2 assigned with a variable q to store the resultant value in the register v1 assigned with a variable i.

An instruction (3) is an instruction for performing subtraction between the values of the registers v1 and v2 to store the resultant value in the register v2 assigned with a variable j.

An instruction (4) is an instruction for performing addition between the values of the registers v1 and v2 to store the resultant value in the register p1 supposed to be assigned with the first argument.

An instruction (5) is an instruction for performing subtraction between the values of the registers v1 and v2 to store the resultant value in the register p2 supposed to be assigned with the second argument.

An instruction (6) is an instruction for calling a procedure g.

An instruction (7) is an instruction for storing a return value in the register r supposed to be stored with the return value.

An instruction (8) is an instruction for returning a register if the register is saved by the instruction (1).

An instruction (9) is an instruction for returning control from the procedure g to the procedure in which the procedure g is called.

An instruction (10) is an instruction in which the value of the register v1 is changed by the procedure g, and the register v1 is saved when use of the register v1 during execution of this instruction is described in the register use information storing unit.

An instruction (11) is an instruction for subtracting 1 from the register p1 assigned with a first argument r to store the resultant value in the register v1 assigned with a variable k.

An instruction (12) is an instruction for storing the value of the register v1 in an address of an array element a[s] determined by adding the start address of an array a to the register p2 assigned with a second argument s.

An instruction (13) is an instruction for returning a register if there is a register saved by the instruction (10).

An instruction (14) is an instruction for returning control from the procedure g to the procedure in which the procedure g is called.

In the above instructions, marks, added to the registers v1 of the instructions (5) and (12) and the register v2 of the instruction (7) represent that the use of the corresponding registers is ended by execution of the instructions.

Figure 7:
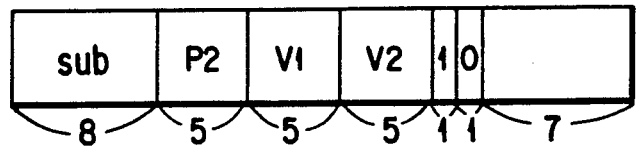
FIG. 7 is a view showing a format of an instruction.

FIG. 6 shows a machine instruction corresponding to the instruction (4) shown in FIG. 3 or the instruction (6) shown in FIG. 4. FIG. 7 is a machine instruction corresponding to the instruction (5) shown in FIG. 5 in the register use information updating unit 5.

The instruction shown in FIG. 6 basically includes 8 bits as a field (sub) representing an instruction code, 5 bits as a field (p2) representing a destination register, 5 bits as a field (v1) representing a first operand, and 5 bits as a field (v2) representing a second operand.

The register use information updating unit 5 describes pieces of information of use start and end registers in an instruction. In this case, registers which are referred to the execution of the instruction, a use end register is not referred to in subsequent instructions.

Therefore, the instruction includes a field representing whether the register referred to by the instruction is referred to by subsequent instructions.

In the instruction of the first embodiment shown in FIG. 7, a field having 2 bits and representing whether the value of a register referred to by the instruction is referred to by subsequent instructions is added to the field shown in FIG. 6. When the value is not referred to by the instructions, the 2 bits are set. In the instruction (5) shown in FIG. 5, since it is described that use of the register v1 is ended by this instruction, a field corresponding to the register v1 is set, and a field corresponding to the register v2 is not set.

A use start register is a register whose value is defined by execution of an instruction. Since this register is a destination register (register in which the result of the instruction is stored), the register can be realized without adding a new field. Therefore, the instruction shown in FIG. 7 includes a field representing whether use of a source register is ended by the instruction so as to realize the register.

In this case, the register use information updating unit 5 instructs a pair of a field of the destination register and a field representing whether a source register is referred to in subsequent instructions.

Information of start or end of use of a register is extracted such that a compiler analyzes the lifetime of a register with respect to a program described in a high-level language. In a program described by an assembler language, the information may be explicitly described in this program, or an analyzing program for analyzing the lifetime of the register is created from a program which is not explicitly described, such that the information is extracted by this analyzing program.

Figure 8:
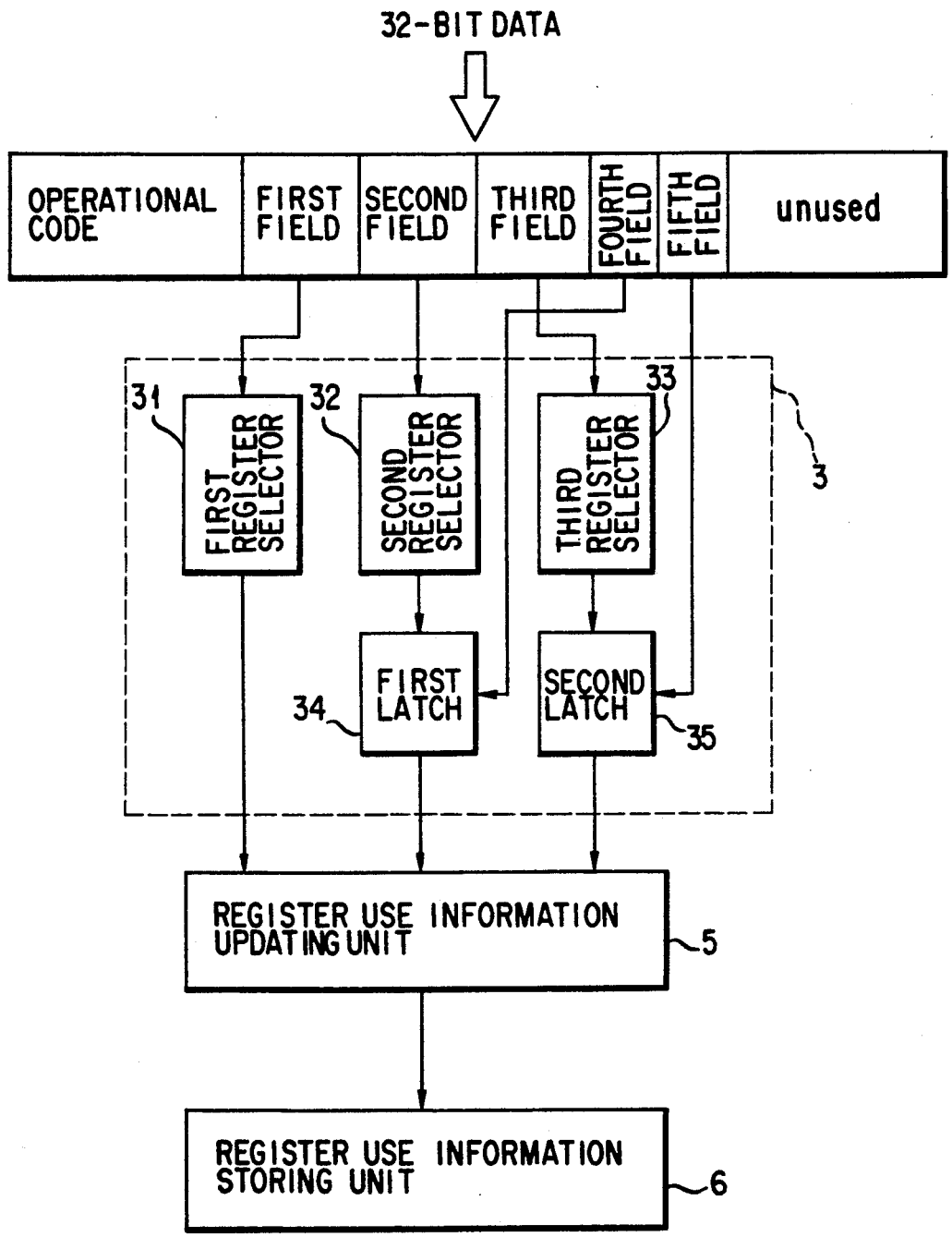
FIG. 8 is a detailed part of the embodiment shown in FIG. 1.

FIG. 8 shows a detailed arrangement of the register use information detecting unit 3, the register use information updating unit 5, and the register use information storing unit 6 which are used for the instruction shown in FIG. 7.

The register use information detecting unit 3 includes first, second, and third register selectors 31, 32, and 33 for extracting register numbers from register fields described in the instruction.

The first register selector 31 extracts a register from a first field consisting of 23rd to 19th bits of the instruction. The first field represents a register number, use of which is started by executing this instruction.

The second register selector 32 extracts a register from a second field consisting of 18th to 14th bits of the instruction. The second field represents a register number, use of which is ended by executing the instruction while the eighth bit is set. A first latch 34 is connected to the output of the second register selector 32, and the latch 34 sends the register number to the register use information updating unit 5 only when the eighth bit is set.

The third register selector 33 extracts a register from a third field consisting of 13th to 9th bits of the instruction. The third field represents a register number, use of which is ended by executing the instruction. A second latch 35 is connected to the output of the third register selector 33, and the latch 35 sends the register number to the register use information updating unit 5 only when a seventh bit is set.

The register use information storing unit 6 has bits arranged such those register numbers included in a computer correspond to the bits.

The register use information updating unit 5 sets a bit corresponding to the register use information storing unit 6 according to an output from the register use information detecting unit 3 when use of a register is started, and a bit corresponding to the register use information storing unit 6 is cleared when the use of the register is ended. By this operation, the register use information storing unit 6 sets a bit corresponding to a register which is required for a program currently executed at this time.

When a procedure is called in the first embodiment, a register is saved by using the instructions (1) and (5) shown in FIG. 5.

Figure 9:
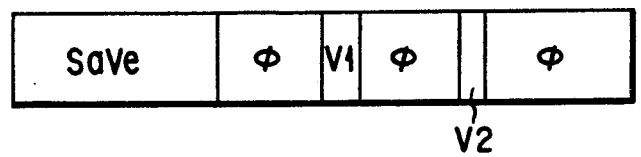
FIG. 9 is a view showing a format of a register saving instruction of the first embodiment of the present invention.
Figure 10:
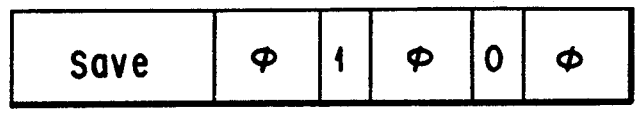
FIG. 10 is a view showing an actual application of the register saving instruction.

FIG. 9 shows the instruction (1) of FIG. 5. In FIG. 9, in addition to a code representing instruction type save, bits v1 and v2 corresponding to registers whose values may be changed are set, and bits corresponding to the remaining registers have cleared fields Φ. FIG. 10 is a view showing the bits v1 and v2 (FIG. 9) in detail and shows a state in which the bit v1 is set, and the bit v2 is not set.

When this instruction is to be executed by the instruction executing unit 4, the register use information referring unit 7 reads out a bit string from the register use information storing unit 6 and calculates a logical AND between the bit string and a bit string shown in the instruction, a register corresponding to the set bit is saved by the logical AND. At this time, the resultant value of the logical AND is also saved. A bit of the register use information storing unit 6 corresponding to the saved register is cleared.

Registers are returned by using the instructions (8) and (13) of FIG. 5. Since a saved register can be known by calling the saved resultant value of the logical AND, the corresponding register may be returned. A bit of the register use information storing unit 6 corresponding to the returned register is set.

An operation of the first embodiment according to execution of the instruction string shown in FIG. 5 will be described below.

When the instruction (1) is executed, a logical AND between a bit string of the register use information storing unit 6 and a bit string set in the instruction is calculated, a register corresponding to the set bit and the resultant value of the logical AND are saved. A bit of the register use information storing unit 6 corresponding to the saved register is cleared.

When the instruction (2) is executed, since a value is defined in the register v1, a bit of the register use information storing unit 6 corresponding to the register v1 is set.

When the instruction (3) is executed, since a value is defined in the register v2, a bit of the register use information storing unit 6 corresponding to the register v2 is set.

When the instruction (5) is executed, since use of the register v1 is ended, a bit of the register use information storing unit 6 corresponding to the register v1 is cleared.

When the instruction (7) is executed, since use of the register v2 is ended, a bit of the register use information storing unit 6 corresponding to the register v1 is cleared.

When the instruction (10) is executed, a logical AND between a bit string of the register use information storing unit 6 and a bit string set in the instruction is calculated, the register v1 and a bit string in which only the register v1 is set is saved. In this case, a bit of the register use information storing unit 6 corresponding to the register v1 is cleared.

When the instruction (12) is executed, since use of the register v1 is ended, a bit of the register use information storing unit 6 corresponding to the register v1 is cleared.

When the instruction (13) is executed, saving information of the saved register is read out. In this case, since it is known that only the register v1 is saved, only the register v1 is returned. A bit of the register use information storing unit 6 corresponding to the register v1 is set.

When the instruction (8) is executed, saving information of the saved register is read out. In this case, since the saved register is known, only the saved register is returned. A bit of the register use information storing unit 6 corresponding to the returned register is set.

With the above arrangement, in calling a procedure, the minimum number registers need be saved, i.e., a value must be stored after returning from the procedure. In addition, only a register changed by a callee procedure can be saved/returned.

A register saving operation performed when execution of a program is interrupted by interruption processing will be described below.

In the same method as the above method of calling a procedure, a register required when the execution is interrupted by the interruption processing can be known by referring to the register use information storing unit 6. Therefore, when a register is to be saved by interrupt, only a register corresponding to a corresponding set bit of the register use information storing unit 6 is saved. In this case, when the register use information storing unit 6 is also saved, since the saved register is known, in a returning operation, only the saved register is returned on the basis of the content stored in the register use information storing unit 6.

Register assignment according to the second embodiment of the present invention will be described below. In the second embodiment, a case using the program shown in FIG. 2 is taken as an example.

Since the codes of instruction strings shown in FIGS. 3 and 4 are formed such that the same register is used in procedures f and g, this register must be saved. In the instruction string shown in FIG. 5, although the number of registers to be saved is minimum, a saving operation must be performed.

Since the above conventional register assignment is statically performed by Software, it is very difficult to analyze which register is used when a procedure is called, assignment must be performed in units of procedures. For this reason, although there is an empty register, since registers in use are assigned, the registers must be frequently saved/returned.

FIG. 11 is a block diagram showing an arrangement of a computer according to the second embodiment of the present invention. The same reference numerals as in FIG. 1 denote the same parts in FIG. 11, and a detailed description thereof will be omitted. As shown in FIG. 11, a register mapping unit 8 is connected to the output of a register use information detecting unit 3. The register mapping unit 8 has a function of obtaining correspondence between register numbers designated in a program and register numbers of the computer.

With the above arrangement, only virtual register assignment is performed by the software, and an empty register can be searched and assigned during execution of the program.

Figure 12:
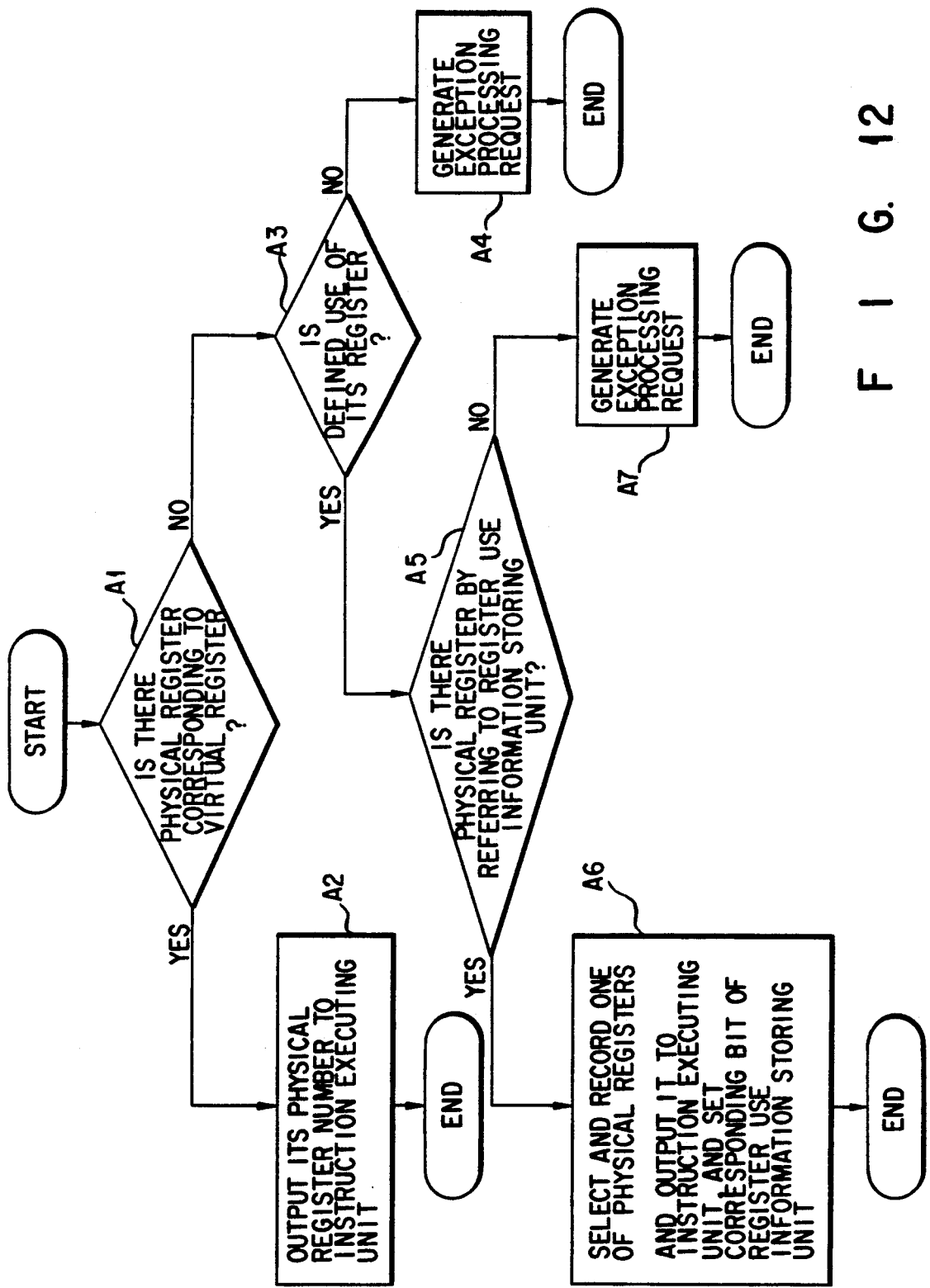
FIG. 12 is a flow chart for explaining an operation of a register mapping unit of the embodiment shown in FIG. 11.

FIG. 12 is a flow chart showing an operation of the register mapping unit 8 shown in FIG. 11. The register use information detecting unit 3 has the same function as described above. The register use information detecting unit 3 detects pieces of information such as information of a register number of an input instruction, information representing whether the value of the register number is defined or referred to, and information representing whether use of the register is ended when the register number is referred to.

The register mapping unit 8 determines (step A1) whether a register number (to be referred to as a physical register number hereinafter) included in the computer and corresponding to a register number (to be referred to as a virtual register number hereinafter) described in the program is registered. In step A1, when the physical register number is registered, the physical register number is output to an instruction executing unit (step A2). When the physical register is not registered, it is determined whether use of the register is defined or referred to (step A3).

In step A3, when the use of the register is referred to, a register whose value is not defined is referred to. Since this means an abnormal instruction string, the register mapping unit 8 generates an exception processing request (step A4). When the value of the register is defined, the register use information storing unit 6 is referred to, and the register mapping unit 8 determines whether there is an empty register (step A5).

If YES in step A5, one of empty registers is selected, the register is registered as a physical register corresponding to a virtual register and is output to an instruction executing unit 4, and a bit of the register use information storing unit 6 corresponding to the register is set (step A6). If NO in step, since any register must be saved to obtain a usable register, the register mapping unit 8 generates an exception processing request (step A7).

This exception processing request is detected by an operating system, and a register saving operation and clearing of a bit of the register use information storing unit 6 corresponding to the saved register are performed by the operation system or another program called from the operation system.

FIG. 13 is a view showing an instruction string for performing register assignment according to the program shown in F i g. 2.

In FIG. 13, registers p1, p2,... are used as arguments sent to a procedure, a register r is used as a value returned from the procedure, and registers v1, v2,... are used as variables used in the procedure.

An instruction (1) is an instruction for performing addition between the value of the register p1 assigned with a variable p and the value of the register p2 assigned with a variable q to store the resultant value in the register v1 assigned with a variable i. In this case, the register mapping unit 8 checks whether physical register numbers corresponding to the virtual registers p1 and p2 are registered. When the physical register numbers are registered, the physical register numbers are output to the instruction executing unit 4. The register mapping unit 8 generates an exception processing request when the physical register numbers are not registered. In addition, the register mapping unit 8 checks whether a physical register number corresponding to the virtual register v1 is registered. When the physical register number is registered, the physical register number is output to the instruction executing unit 4. The register mapping unit 8 refers to the register use information storing unit 6 when the physical register number is registered, and the register mapping unit 8 checks whether there are empty registers.

When there are empty physical registers, the register mapping unit 8 selects one of the empty physical registers and registers one of the empty physical registers as a physical register corresponding to the virtual register. The register mapping unit 8 outputs the above registration result to the instruction executing unit 4 and sets a bit corresponding to the register in the register use information storing unit 6. On the other hand, when there is no empty physical register, since the register mapping unit 8 must save any physical register unused in a function to obtain a usable physical register, the register mapping unit 8 generates an exception processing request.

By this exception processing request, the register is saved according to an operating system detected by the operating system or an another program called from the operating system, and a corresponding bit of the register use information storing unit 6 corresponding to the saved register. Thereafter, a physical register corresponding to the register v2 is assigned, and the execution is restarted.

In each of instructions (2) and ( 3 ), the same operation as that of the instruction (1) is performed.

The register v1 of the instruction (4) is to be processed, a bit of a physical register number corresponding to the register v1 is cleared after execution of the instruction is ended.

when the instruction (6) is executed, a bit of the physical register number corresponding to the register v2 is cleared.

Instructions (7)and (11)are instructions for returning registers saved upon an exception processing request. The register is saved in a stack as a pair of a value and a physical register number. The value and physical register number may be returned to the register by executing the instructions (7)and (11). In this case, when there is no saved register, the value and physical register number need not be returned.

According to the above description, an instruction string does not include an instruction for saving a register, and a register is saved only when an exception processing request is generated. The register saving/returning operation need not be performed in, calling a procedure if unused registers are present. For this reason, according to the present invention, a program can be executed at a high speed. In addition, since a saving operation of a register need not be statically instructed, registers which are to be saved and registers which are not to be saved need not be classified depending on a called procedure, and the registers can be effectively used.

The modification of the second embodiment will be described referring to FIGS. 14 and 15.

when the exception processing request shown in the step A4 of FIG. 12 is occurred, a register is processed as an undefined register reference in above embodiment. In this modification, whether a physical register corresponding to a virtual register is saved or not is checked by the operating system or a program called from operating system. If the physical register is saved, the physical register is returned. If not so, the processing is executed as the undefined register reference. Therefore, even if a value of the register is saved, since the register is returned when it referred, instructions (7) and ( 11 ) in the instruction string shown in FIG. 13 need not be executed. If empty physical registers are not found when a virtual register is defined, the physical registers can be saved whether these are used in this function.

In the second embodiment and its modification, when an instruction indicating an end of use of register is not executed and the use of register is ended, the corresponding bit registered in the register use information storing unit 6 may not be cleared. FIG. 14 shows that a branch condition is exist in a function f, and the control is returned to the function calling the function f when the condition is satisfied.

FIG. .15 shows an assembly program corresponding to a program shown in FIG. 14.

An instruction (3) is an instruction for comparing a content of register p1 and Φ.

An instruction (4) is an instruction in which the control is branched an instruction shown in L1 (corresponding to an instruction (11) in this embodiment), if the register p1 is smaller than Φ, according to the resultant of execution of the instruction (3). when the control is branched, since instructions (6) and (8) are not executed, the corresponding bit of the physical register in the register use information storing unit 6 corresponding to virtual registers v1 and v2 are not cleared. To solve this problem, an instruction for clearing an assignment bit in register use information storing unit 6 is defined.

An instruction (12) clears the corresponding bits in register use information storing unit 6 corresponding to virtual registers v1 and v2.

Detection of abnormal reference of an undefined register will be described below as the third embodiment of the present invention.

FIG. 16 is a block diagram showing an arrangement of a computer according to the third embodiment of the present invention. The same reference numerals as in FIG. 1 denote the same parts in FIG. 16, and a detailed description of thereof will be omitted. As shown in FIG. 16, a computer according to this embodiment includes a register collating unit 9 in addition to the computer shown in FIG. 1. The register collating unit 9 collates a register referred to and detected by a register use information detecting unit 3 and an output from a register use information referring unit 7. The register collating unit 9 generates an exception processing request when a bit corresponding to the register is not set in a register use information storing unit 6. Therefore, according to this embodiment, an abnormal reference of an undefined register can be detected.

The fourth embodiment of the present invention will be described below.

In a computer having registers such as an integer arithmetic register and a floating-point register which are used for different applications, even when a program does not use one of the registers, there is no information representing that the register does not use one of the registers. For this reason, during interruption processing, both the registers must be saved/returned.

In this case, each of the registers has the following arrangement to omit saving/returning operations.

A virtual multi-task operating system 0 operated in a computer M is assumed, and a case for improving a switching efficiency of processes of this system 0 will be described below.

The computer M operates a processor P as a central processing unit and includes a floating-point arithmetic coprocessor F. The processor P has several general registers, and the floating-point arithmetic coprocessor F has several floating-point registers. It is assumed that the computer M has an interval timer interrupting function of interrupting the processor P every predetermined time interval.

At this time, the operating system 0 is an operating system having a multi-tasking function and can time-division-multiplex and executes a plurality of user processes. A switching operation between the processes is performed as follows. That is, a currently executed process is interrupted by interval timer interrupt, an interruption handler of the system 0 is operated, the state of the currently executed process is saved by this interruption handler, and the state of another process is returned. In the saving/returning operations of states of the processes, saving/returning operations of the contents of the registers of the processor P and the floating-point arithmetic coprocessor F are included, as a matter of course.

In this embodiment, an unused register detecting means for detecting a register which is not used in the interrupted program is incorporated. A case wherein an unused register is detected in the registers of the floating-point arithmetic coprocessor F will be described below with reference to FIG. 17.

In a program language processing system, programs for an operating system 0 (18) are generated from a source program using a language processor 12, and unused flags of (14) of the registers of the floating-point arithmetic coprocessor F are arranged in an object module 13 of these programs. Each of the flags of (14) is a flag representing that the programs included in the object module 13 do not use the floating-point arithmetic coprocessor F.

The language processor 12 such as a compiler or assembler used for the operating system 0 (18) has a special function of setting an appropriate value in each of the flags of (14). The language processor 12 used for the operating system 0 (18) has the following function. That is, when the object module 13 is to be generated, and a machine language instruction included in this module is checked, "1" is set in each of the flags of (14) when no instruction using the floating-point arithmetic coprocessor F is included in the module, and "0" is set in each of the flags of (14) when an instruction using the floating-point arithmetic coprocessor F is included in the module.

In a load module 16, as in the object module 13, each flag fl (17) represents that each program included in the load module 16 does not use the floating-point arithmetic coprocessor F. In this case, a linker 15 for the operating system 0 (18) has a function of setting "1" in the flags fl (17) of the load module 16 when "1" is set in all the flags fo (14) of the object module 13.

The operating system 0 (18) includes flags fp (19) representing that each of all user processes operated on the operating system 0 (18) does not use the floating-point arithmetic coprocessor F.

The operating system 0 (18) checks the flags fl (17) before the process is started to be executed, and the operating system 0 (18) sets "1" in the corresponding flags fp (19) when "1" is set in the flags fl (17).

As described above, when the operating system 0 (18) itself and the language processor for the operating system O (18) have a special function "1" is set in the flag fp (19) for a process in which the floating-point arithmetic coprocessor F is not used. Therefore, an unused register of the floating-point arithmetic coprocessor F can be detected by checking checked the flag fp (19).

In a register determined as an unused register, saving-/returning operations are omitted. In this case, in an interval timer interruption handler of the operating system O (18), a program is executed as a conditional branch program by the values of the flags fp (19). That is, when a register is to be saved to switch processes in the interruption handler, the flag fp (19) of a process to be interrupted is referred to, and the register of the floating-point arithmetic coprocessor F is saved when "0" is set in the flag fp (19). In contrast to this, when "1" is set in the flag fp (19), conditional branch processing is performed such that the register of the floating-point arithmetic coprocessor F is not saved.

FIG. 18 is a flow chart for performing the saving operation of the above processing operations.

According to FIG. 18, a register of a processor P is saved (step B1). The value of the flag fp is checked (step B2). When the value of the flag fp is set to be 0, the register of the floating-point arithmetic coprocessor F is saved. In step B2, when the value of the flag fp is set to be 1, the register of the floating-point arithmetic coprocessor F is not saved. As described above, an unused register can be prevented from saving.

On the other hand, a returning operation is performed in the same manner as that of the saving processing operation. That is, the flag fp (19) of a process to be returned is referred to. When "0" is set in the register fp (19), the register of the floating-point arithmetic coprocessor F is returned. On the other hand, when "1" is set in the flag fp (19), conditional branch processing is performed such that the register of the floating-point arithmetic coprocessor F is not returned.

As described above, in a user process in which the floating-point arithmetic coprocessor F is not used, since saving/returning operations of the floating-point arithmetic coprocessor F which are performed together with a process switching operation can be omitted, the efficiency of the process switching operation of the operating system 0 can be improved.

In the fourth embodiment, a compiler or assembler has a special function to detect an unused register. This function can be installed as one program independent of the compiler or assembler.

A virtual operating system 0 operated in a computer M is assumed, and a case wherein an efficiency of keyboard input interruption processing of the system 0 is improved will be described below.

The computer M operates a processor P as a central processing unit. The processor P includes 32 general registers which are numbered from 0 to 32. The processor P has a machine language instruction stregs for writing the contents of a plurality of registers in a memory and a machine language instruction ldregs for reading the content of the memory to the plurality of registers. The stregs instruction has two operands. The first operand of the stregs is a 32-bit mask representing a register to be transferred, and the content of a register having the same register number as a bit number of a bit set at logic "1" of the mask is transferred to the memory. The second operand of the stregs is an effective address of the memory, and the content of the register designated by the first operand is transferred to a continuous memory area starting from the effective address. The ldregs instruction has two operands. The first operand of the ldregs is a mask representing a register to be transferred as in the stregs instruction, and the second operand is an effective address of a transfer source.

In this case, the operating system 0 is an operating system having a keyboard input interruption processing handler. When an interrupt from a keyboard occurs during execution of a user process, the operation system 0 interrupts the execution of the user process, and the keyboard input interruption handler is started. In this handler, characters input from the keyboard are read, and they are input to a keyboard input queue prepared in the operating system O. At this time, it is assumed that the program itself of the keyboard interruption handler knows that 20 general registers consisting of the 0th to 19th registers are used. In a conventional technique, all the 20 registers used by the handler are saved at the start of the interruption handler, and the 20 registers which are saved are returned at the end of the handler. These saving/ returning operations are performed such that the stregs and 1 dregs instructions are used to designate 000 FFFFF in hexadecimal notation as the first arguments of the instructions.

In the fourth embodiment, although an interrupted program includes an unused register detecting means for detecting an unused register, its essential function is the same as described above.

In the fourth embodiment, it is assumed that it is detected whether each of registers of the processor P is used in a program. Therefore, a total of 32 flags are required to represent that each of the registers of the processor P is not used in the program. In this case, a set of the 32 flags regarded as one data having a 32-bit length is called an unused register mask.

In a program language processing system for generating a program for an operating system O, a field fo having a 32-bit length is arranged in the object module of the operating system 0. This field fo is a field for holding an unused register mask representing a register which is not used by a program included in the object module. The field fo represents that a register having the same register number as the bit number of a bit set at logic "1" in the unused register mask is not used in the object module. A language processor such as a compiler or assembler used for the operating system 0 includes a special function of setting an appropriate value in the field fo. The language processor checks a machine language instruction in the object module. When no instruction for accessing a register is set in the object module, "1" is set in the bit of the field fo having the same bit number as the corresponding register number in the object module.

In a load module, as in the object module, a field fl having a 32-bit length and representing a register which is not used by a program included in the load module is arranged. The field fl is an unused register mask representing a register which is not used by the program included in the load module. The field fl represents that a register having the same register number as the bit number of a bit set at logic "1" in the unused register mask is not used in the load module. A linker used for the operating system 0 includes a function of calculating a logical AND of bits of the field fo of the object module in units of bits to set the resultant values to the corresponding bits of the field fl.

In the operating system 0, a field fp having a 32-bit length and representing a register which is not used by a corresponding process is arranged in each of all user processes which are operated on the operating system 0. The operating system 0 includes a function of setting the value of the field fl of the load module in the field fp before the process is started to be executed.

With the above arrangement, since the operating system 0 itself and the language processor for the operating system 0 have the special function, a mask representing a register which is not used by a program is set in the field fp, thereby detecting an unused register.

A register determined as an unused register is free from saving/returning operations. In a conventional keyboard interruption processing routine, a total of 20 general registers used in the interruption processing routine are saved/returned. However, a register which need be actually saved/returned is used in the interrupted program, and the register is a register used in the interruption processing routine. A register which is used in the interruption processing routine but not used in the interrupted program need not be saved/ returned.

In order to omit the saving/returning operations of an unused register, the mask fp representing the register used in the interrupted program and a mask 000FFFFF representing the register used in the interruption processing routine are logically ANDed in units of bits, and the logical ANDs are given as first arguments of the stregs and ldregs instructions.

Therefore, since the saving/returning operations of an unused register can be omitted with the above arrangement, an efficiency of the keyboard interruption processing of the operating system can be improved.

The fifth embodiment will be described below. Since the fifth embodiment has the same arrangement as that of the first embodiment, a view showing the arrangement will be omitted. The fifth embodiment is distinguished from the first embodiment by changing the function of a register use information updating unit 5.

The difference in operation between the first embodiment and the fifth embodiment will be described below.

Pieces of information of a use start register and a use end register extracted by a register use information detecting unit 3 are output to the register use information updating unit 5. The register use information updating unit 5 has a function of respectively adding start bits and end bits to instructions when use of a register is started and ended by the pieces of information.

Figure 19A:
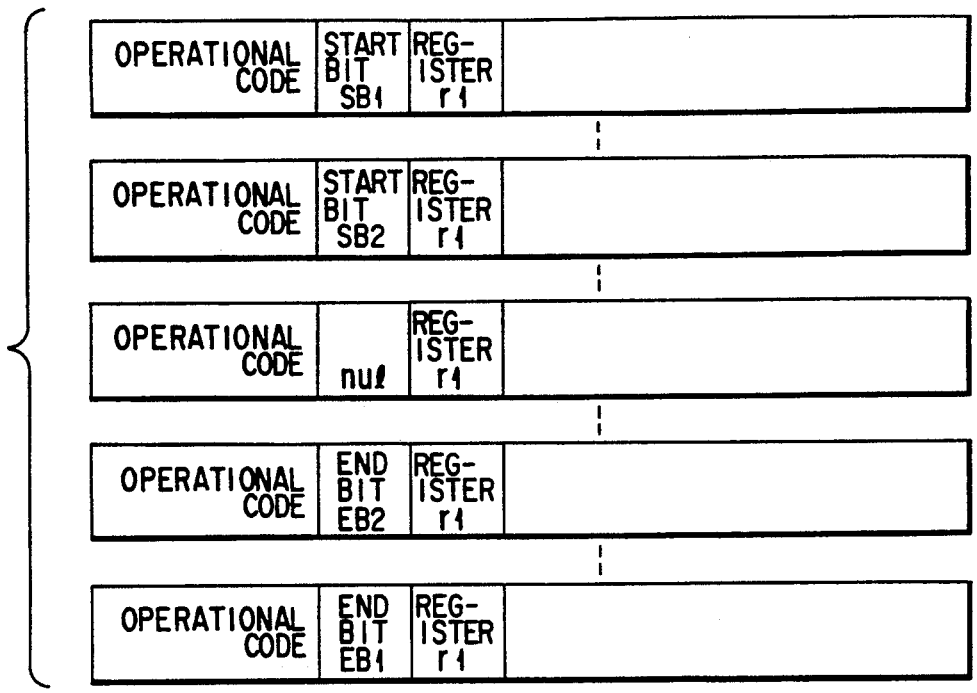
Figure 19B:
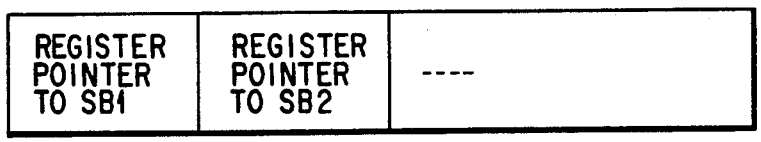
Figure 19C:
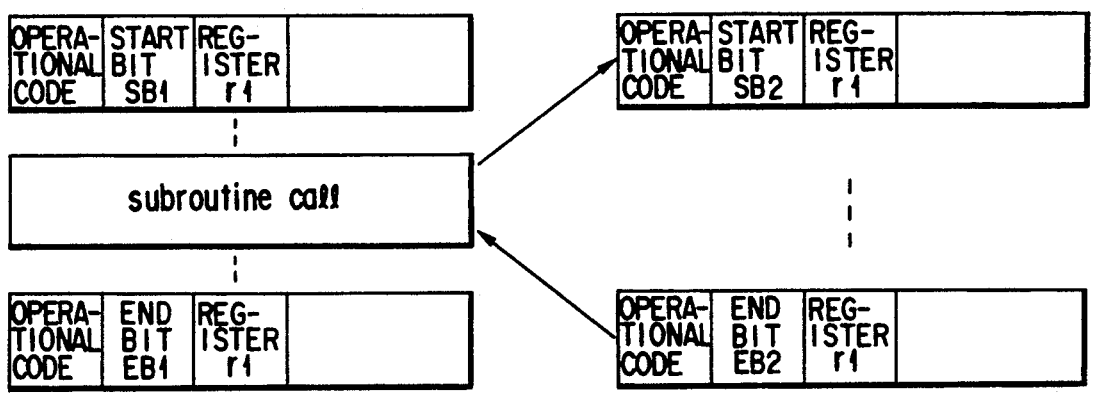

An operation of this embodiment arranged as described above will be described below with reference to FIGS. 19A to 19C. FIG. 19A shows a program in which a register is referred to before use of a register in an execution program is ended. FIG. 19B is a view showing the shift of a pointer when use of the same register is continuously started. FIG. 19C is a view showing a case wherein use of the same register is started by a subroutine when the subroutine is called during execution of an execution program using a given register before use of the register is ended.

FIG. 19A shows a case wherein, when a given register (represented by r1) is used, before the use of the given register is ended, use of the same register r1 is started. In FIG. 19A, start bits for the registers r1 are given as SB1 and SB2, and end bits for the registers r1 are given as EB1 and EB2. It is assumed that the bits SB1, SB2, EB1, and EB2 are sequentially detected in this order.

As shown in FIG. 19B, when the bit SB1 is detected, a pointer for the register r1 is set. When the bit SB2 is detected, the pointer set upon detection of the bit SB1 is incremented by 1. Therefore, after the bit SB2 is detected, the register r1 is assigned according to the value of the incremented pointer.

When the bit EB2 is detected, the value of the pointer is cleared to decrement the pointer by 1. Therefore, after the bit EB2 is detected, the register r1 is assigned according to the value of the pointer set when the bit SB1 is detected. For this reason, even when the same register number is overlappingly referred to in a continuous program, since a register pointer set by another start bit (in this case, SB1) is not broken, a register set by the bit SB1 after the bit EB2 is detected can be used. The bit EB1 is detected, a pointer set in correspondence with the first register r1 is cleared.

In addition, as shown in FIG. 19C, in a subroutine, when use of a use end register is started before a subroutine is called, the present invention can be applied by the shift of a pointer shown in FIG. 19B as in the case shown in FIG. 19A.

According to the fifth embodiment, when the same register number is overlappingly referred to in a continuous program, a register pointer set by another start bit (SB1) is not broken. For this reason, after a subsequently set end bit (EB2) representing an end of use of the register is detected, the register set by a previously set start bit (SB1) representing a start of use of the register can be used.

In addition, at a start of use of the overlapping register, a register pointer corresponding to the register is incremented by 1, and the register pointer is cleared at an end of the use of the overlapping register to decrement the register pointer by 1. For this reason, since an apparent register amount is increased, registers can be effectively used while the number of fields of the registers is small. Therefore, according to the fifth embodiment, a register+stack type hybrid machine can be obtained.

The present invention is not limited to the above embodiments. It is to be understood that various changes and modifications may be effected without departing from the spirit and scope of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer for executing at least one program having a plurality of instructions, comprising:
    a plurality of registers for storing an arithmetic value during execution of said program;
    register use information detecting means for extracting pieces of use information of use start registers and use end registers of said registers in accordance with said instructions in said program;
    register use information storing means for storing the pieces of use information of said registers in which the arithmetic value need be stored to execute said instructions;
    instruction executing means for performing predetermined processing for a desired register of said plurality of registers on the basis of the pieces of the use information of said registers stored in said register use information storing means; and
    register use information updating means for updating the pieces of use information of said registers stored in said register use information storing means in accordance with outputs from said register use information detecting means and said instruction executing means.

2. A computer according to claim 1, wherein each of said plurality of instructions has a plurality of fields, and said register use information updating means includes means for adding a field to each of said instructions, said field representing whether a register in use is referred to in a subsequent instruction during execution of said program.

3. A computer according to claim 1, wherein each of said instructions has a first field, a second field, a third field, a fourth field, and a fifth field, and
    said register use information detecting means includes:
    a first register selector for extracting a register number from said first field of said instruction;
    a second register selector for extracting a register number from said second field of said instruction;
    a third register Selector for extracting a register number from said third field of said instruction;
    a first latch for transferring the register number extracted by said second register selector to said register use information updating means when said fourth field of said instruction is set; and
    a second latch for transferring the register number extracted by said third register selector to said register use information updating means when said fourth field of said instruction is set.

4. A computer according to claim 1, wherein instruction executing means includes means for saving/returning a register for a desired register of said plurality of registers on the basis of the pieces of the use information of said registers stored in said register use information storing means.

5. A computer according to claim 1, further comprising register assigning means for assigning a virtual register to said instruction in said program and a physical register with reference to said register use information storing means during execution of said program, and wherein instruction executing means includes means for performing a register assignment for a desired register of said plurality of registers on the basis of the pieces of the use information of said registers stored in said register use information storing means.

6. A computer according to claim 5, wherein said register assigning means includes means for checking whether a physical register number corresponding to a virtual register number described in said instruction of said program to select an unused register from the registered physical register number.

7. A computer according to claim 5, wherein said instruction executing means includes means for performing an instruction which updates a use information stored in said register use information storing means corresponding to a physical register detected an end of use, even if when an end instruction of a use of the physical register assigned during execution of said program is not performed.

8. A computer according to claim 1, further comprising register collating means for inhibiting to output a register reference processing request when a corresponding register is not in use in accordance with a result obtained when said register use information storing means checks, in response to a register reference request of said instruction, whether said corresponding register is in use, and wherein instruction executing means includes means for detecting an abnormal reference of a register for a desired register of said plurality of registers on the basis of the pieces of the use information of said registers stored in said register use information storing means.

9. A computer for executing a plurality of programs each having a plurality of instructions, comprising:
 a plurality of registers for storing an arithmetic value during execution of said programs;
 register use information detecting means for detecting a predetermined unused register in said registers in each of said programs;
 register use information storing means for storing information representing that said predetermined register in each process operated on an operating system on the basis of the detection result;
 instruction executing means for omitting predetermined processing for a register determined as an unused register when the information of the process prior to execution of the process is checked; and
 register use information updating means for updating the pieces of use information of said registers stored in said register use information storing means in accordance with outputs from said register use information detecting means and said instruction executing means.

10. A computer according to claim 9, wherein
 said register use information updating means includes means for adding a flag representing a use state of a predetermined register, and
 said register use information detecting means includes means for detecting a predetermined unused register by checking a content of said flag.

11. A computer for executing at least one program having a plurality of instructions, comprising:
 a plurality of registers for storing an arithmetic value during execution of said program;
 means for adding a start bit to said instruction in accordance with a register use start instruction and adding an end bit to said instruction in accordance with a register use end instruction during execution of said program;
 means for setting a register pointer when the start bit is detected;
 register pointer incrementing means, use of which is started by an instruction added with the start bit, for incrementing a register pointer when a start bit for starting use of the same start bit is detected before the use of said register pointer incrementing means is ended; and
 means for clearing a corresponding register pointer every time when an end bit is detected to decrement the register pointer.

* * * * *